United States Patent
Johnson, Jr. et al.

[15] 3,700,758

[45] Oct. 24, 1972

[54] HOT MELT ADHESIVE COMPOSITIONS COMPRISING POLYOLEFIN AND DAC-B RESIN

[72] Inventors: Sam H. Johnson, Jr.; Robert A. Mears; Vernon K. Park, all of Longview, Tex.

[73] Assignee: Eastman Kodak Company, Rochester, N.Y.

[22] Filed: Aug. 27, 1970

[21] Appl. No.: 67,563

[52] U.S. Cl..........260/897 R, 260/45.85, 260/45.95, 260/82, 260/897 A, 260/897 B
[51] Int. Cl.............................................C08f 29/12
[58] Field of Search................................260/897, 82

[56] References Cited

UNITED STATES PATENTS

| | | |
|---|---|---|
| 2,914,501 | 11/1959 | D'Ascoli...................260/33.6 |
| 3,070,568 | 12/1962 | Gessier et al. ...............260/41 |
| 3,247,142 | 4/1966 | Brunson et al..............260/23 |
| 3,437,629 | 4/1969 | Von Bramer et al. ....260/31.8 |
| 3,418,396 | 12/1968 | Edwards et al. ...........260/897 |

*Primary Examiner*—Murray Tillman
*Assistant Examiner*—C. J. Seccuro
*Attorney*—Clyde L. Tootle and Cecil D. Quillen, Jr.

[57] ABSTRACT

Improved hot melt adhesives and processes for their preparation are disclosed. These hot-melt adhesive compositions are composed of a mixture of a polyolefin component and a new hydrocarbon resin prepared from a fraction resulting from a thermal cracking operation.

9 Claims, No Drawings

HOT MELT ADHESIVE COMPOSITIONS COMPRISING POLYOLEFIN AND DAC-B RESIN

This invention relates to novel compositions of matter, processes for their preparation and their uses.

In particular, this relates to a blend of a polyolefin component and low color, high softening point hydrocarbon resins as described in co-pending U. S. Application entitled "Light-Colored, High Softening Point Hydrocarbon Resins and Method for Their Preparation", Ser. No. 067,333, filed Aug. 27, 1970. The blends can be used as hot melt adhesive formulations.

Hot melt adhesives as described in the *Handbook of Adhesives* by Irving Skeist, pp. 447–451, Reinhold Publishing Corporation, 1962, are bonding agents which are distinguished from crosslinking or other chemical reactions. Prior to heating, the hot melt adhesives are 100 percent solids that can be prepared in bulk or pellet form for ease of handling. Application of heat brings the adhesive to the liquid state and after removal of heat it sets by simple cooling.

Hot melt adhesives are useful for bonding wood, paper, plastics, textiles, and other materials and are used extensively in the packaging industry in the fabrication of corrugated paperboard and for cardboard case sealing and closing. The adhesive is generally applied by a hot melt applicator which consists of a reservoir for the adhesive, heating means for melting the adhesive and maintaining it in a molten state, and means for applying the adhesive for the particular end use.

The rate at which the adhesive can be applied is primarily a function of the melt viscosity, i.e., the lower viscosity the faster the rate and in order to increase production rates it would be desirable to operate at higher temperatures to reduce the melt viscosity of the adhesive. However, many prior hot melt adhesives have poor thermal and color stability and exposure to elevated temperatures (350° F. and above) causes the formation of carbonized deposits, gels and color. The carbonized deposits (charred flakes) and gels stop up the applicator nozzles, causing production delays and the increased color prohibits the use of the adhesive in many applications. Therefore, this invention is directed to an adhesive composition which remains stable at elevated temperatures.

In accordance with the present invention is has been discovered that a low color, color stable, high softening point hydrocarbon resin obtained by the process of Ser. No. 067,333, filed Aug. 27, 1970, which comprises polymerizing a mixed hydrocarbon fraction in the presence of $AlCl_3$ in a two-stage reaction system wherein the temperature in the first stage is lower than that in the second stage to obtain a solution containing a high softening point crude resin in good yields. The chlorides are removed from the resin solution by methanol extraction or high temperature lime treatment followed by low pressure hydrogenation and/or alumina treatment followed by high pressure-high temperature hydrogenation to remove color and reduce unsaturation and thereafter stripping the resin solution to obtain a low color, color stable, high softening point hydrocarbon resin in good yields.

One such improved process for preparing a light-color, high softening point hydrocarbon resin comprises polymerizing DAC-B using aluminum chloride as a catalyst in a two-stage reaction system wherein the polymerization is conducted at a temperature of about 50° to 100° C. in the first stage for about 6–10 hours and subsequently polymerized in the second stage at a temperature of about 125° to 150° C. for about 6–10 hours to obtain a solution containing a high softening point crude resin in good yields, removing the chlorides from the resin solution by methanol extraction or high temperature lime treatment followed by low pressure hydrogenation at hydrogen pressure of 100–1000 psig. and/or alumina treatment, followed by high pressure-high temperature hydrogenation at hydrogen pressures of 3,000–6,000 psig. and temperature greater than 300° C. to remove color and reduce unsaturation and thereafter stripping the resin solution to obtain a low color, color stable, high softening point hydrocarbon resin in good yields.

These resins are excellent tackifiers for blending with a polyolefin component to form blends useful as hot melt adhesive formulations. The resins are compatible with the polyolefin component and are thermally stable.

It is an object of this invention to provide new hot melt compositions based on a polyolefin component and the new hydrocarbon resins derived from DAC-B. These adhesives can be used in a great number of applications for the direct sealing of a wide variety of solid substrates which may be similar or dissimilar to one another.

It is a further objective to provide a hot melt adhesive which can be utilized in conventional equipment of the hot melt adhesive industry at elevated temperatures without color formation, formation of carbonaceous material, scumming, or viscosity buildup.

It is a further objective to provide a hot melt adhesive composition that is essentially colorless and odor free.

Another objective is to provide hot melt compositions which have improved shelf-life stability. This enables the product to be stored for periods greater than six months without oxidative degradation and peroxide buildup. When used after storage, the hot melt retains its good color and bonding characteristics. Little peroxide buildup is found to occur and the absence of foaming is noted when melted.

In accordance with the present invention we have found that a blend comprised of a polyolefin component and the novel hydrocarbon resin prepared from DAC-B provides low color, heat stable, color stable and essentially odorless hot melt adhesive compositions. In addition, these compositions have outstanding adhesive properties when compared with compositions formulated with prior hydrocarbon resins.

The polyolefin components useful in the resent invention are the normally solid polymers and copolymers prepared from $\alpha$-monoolefins containing 2–10 carbon atoms. The polyolefin component can be, for example, amorphous or crystalline polypropylene, polyethylene having a density of about 0.90 to about 0.97, blends of such polymers, blends of such polymers with modified polyethylenes, such as thermally degraded polyethylene waxes, and ethylene copolymers such as ethylene vinyl acetate copolymers, ethylene propylene rubbers, and the like. Preferred polyolefin components are polyethylenes having a viscosity of from about 400 cp at 125° C. to about 500,000 cp at 190° C. and densities of from about 0.90 to about 0.92.

The hydrocarbon resins of the present invention have a ring and ball softening point of from about 120° C. to about 155° C. with the preferred range being about 125° to about 140°C., an unsaturation of less than 1 percent (C=C), a Gardner color of less than 5, and contains less than 10 ppm chlorides.

The preferred compositions of this invention contain from 50 to 90 percent polyolefin and from 10 to 50 percent DAC-B resin with the most preferred ranges being 60 to 80 percent polyolefin and 20 to 40 percent DAC-B. resin. In addition, these compositions can contain other ingredients such as stabilizers, fillers, ethylene-vinyl acetate copolymers, and synthetic rubbers depending on the particular application for which they are to be used.

The blends of this invention can be prepared by melt blending of the components according to various methods known in the art. One method we have found satisfactory entails placing the polyethylene, DAC-B resin and antioxidants in a jacketed mixing tank equipped with a Cowles stirrer. The tank is purged with nitrogen and kept under a nitrogen atmosphere. The temperature is raised to about 180° C. and the mixture stirred with the stirring and heating continued until a translucent homogeneous blend is obtained. The blend can them be melt extruded and converted into pellets.

Antioxidants which have been found to give satisfactory results in the compositions of this invention are DLTDP (dilauryl 3,3'-thiodipropionate), BHT (2,6-di-t-butyl-p-cresol), Plastanox 2246 antioxidant [2,2'-methylene bis(4-methyl-6-tert-butyl phenol)] Plastanox 1212 antioxidant (mixed ester of thiodipropionate), Catalin CAO-14 antioxidant [2,2'-methylenebis-(4-methyl-6-tertiary-butylphenol)]. A preferred combination is DLTDP with Catalin CAO-14 antioxidant. The amounts used can vary from 0.05 to 1 percent each with preferred amounts being about 0.25 percent each.

The viscosity of the composition of this invention can vary widely depending on the particular application for which they are formulated. For example, viscosities of from 400 cp at 177° C. to 200,000 cp at 190° C. can be used. However, for most applications the preferred range is from about 1500 cp at 177° C. to about 4,500 cp at 177°C.

The advantages and details of the invention will be better understood from the following examples.

EXAMPLE 1

Blend Preparations

The hot melt formulation was prepared as follows:

Three hundred fifty grams of polyethylene (viscosity of 9,000 cp at 150° C.), 147.5 grams of DAC-B resin (softening point of 133° C.), 1.25 grams Plastanox 2246, and 1.25 grams of DLTDP were added to a 2-liter resin flask fitted with an Anchor blade stirrer, thermowell, and a nitrogen blanket. The flask was heated with an electric heating mantle. When the polyethylene and resin melted, stirring was begun. The mixture was stirred 1 hour at 180° C. under a nitrogen atmosphere. The blend was then poured into a silicon lined paper boat and allowed to cool.

For comparison blends were made with the same type polyethylene in the same proportions as above with the following commercial resins: Nirez 1135 polyterpene resin, softening point of 135° C.; PICCO LTP-115 resin; PICCOLYTE α-135 resin; and Wingtack 95 resin.

Nirez 1135 is a polyterpene resin having a ring and ball softening point of 135° C. manufactured by Heyden Newport Chemical Corporation.

PICCO LTP-115 is a terpene phenolic resin having a ring and ball softening point of 115° C. manufactured by Pennsylvania Industrial Chemical Corporation.

PICCOLYTE α-135 is a polyterpene resin having a ring and ball softening point of 135° C. manufactured by Pennsylvania Industrial Chemical Corporation.

Wingtack 95 is a "terpene like" resin made from isoprene derivatives having a ring and ball softening point of 100° C. This resin is manufactured by Goodyear Tire and Rubber Company.

The tests for measuring oxidative stability of these hot melt compositions are as follows:

Test for Viscosity Stability

A 100-gram sample was aged four days in an open 38 × 200 mm pyrex tube at 177° C., and the viscosity in centapoise was measured daily using a Brookfield viscometer, Model LVT.

Test for Scum Formation

Fifty-gram samples were aged in a 250 ml pyrex beaker and in a 2.5 inch diameter × 0.5 inch deep aluminum dish in a forced air oven at 177° C. These samples were inspected daily for scum formation.

Color stability of the polyethylene-DAC-B formulation was determined by aging a sample in an open 13 × 100 mm pyrex tube at 177° C. and comparing it daily with a set of standards known as "Illuminated Gardner Color Standards for Liquids".

Data of these tests are given in Table 1.

The polyethylene-DAC-B resin formulation shows greatly improved color stability and improved stability toward scum formation compared to the other formulations containing various tackifying resins. Viscosity stability is comparable to the other resins.

TABLE 1.—OXIDATIVE STABILITY OF HOT MELT FORMULATIONS

| | | Stability of sample during aging at 177° C. | | | | | |
|---|---|---|---|---|---|---|---|
| | | Color stability Gardner color | | | Stability toward scum formation days to scum formation | | Viscosity stability, Brookfield viscosity, cp |
| | | | After aging | | Aged in aluminum dish | Aged in Pyrex beaker | After aging |
| No. | Sample Composition | Initial | 2 days | 4 days | | | Initial / 4 days |
| 1 | 70% Polyethylene* 30% DAC-B Resin | 1 | 5 | 7 | 12 | 15 | 3000 / 3100 |
| 2 | 70% Polyethylene* 30% Nirez 1135 resin | 2 | 10 | 12 | 1 | 1 | 3200 / 3400 |
| 3 | 70% Polyethylene* 30% PICCO LTP-115 resin | 5 | 10 | 12 | 2 | 1 | 3000 / 3500 |
| 4 | 70% Polyethylene* 30% PICCOLYTE α-135 resin | 8 | 12 | 13 | 1 | 1 | 2800 / 2840 |
| 5 | 70% Polytheylene* 30% Wingtack 95 resin | 7 | 12 | 13 | 1 | 1 | 2600 / 2600 |

*All samples contain 0.25% DLTDP + 0.25% Plastanox 2246 Antioxidant.

EXAMPLE 2

Blends of polyethylene with DAC-B resin and polyterpene resins, Nirez 1135 resin and PICCOLYTE α-135 resin, were prepared as described in Example 1. Adhesive tests were made on these hot melt blends, the compositions of which are given in the following table. A description of these adhesive tests is given below.

Test Specimen Preparation — "The Determination of the Peel Strength of an Adhesive"

This test method provides a means of measuring the strength of a hot melt adhesive when subjected to a dead weight loading at elevated temperatures. It consists of a 1-inch wide substrate of 30-pound MG Kraft paper sealed across its width with a one-eighth inch wide strip of the adhesive. The adhesive is applied to the unglazed side of the paper and has a thickness before sealing of 0.002 to 0.004 inches. The sealing is performed on a bar sealer under 25 psi pressure for 0.2 second.

One end of the specimen is secured to a horizontal support in an oven and a 100-gram weight is attached to the other end so that the sealed section is placed under 180° angle peeling tension. The oven is turned on and the test specimen observed as the temperature rises. The temperature at which the seal fails is recorded. The elevated temperature peel is the temperature (°F) at failure of a three test minus 4° F.

2 inch Pop-Open Temperatures

The pop-oven tests provide a relative measure of the ability of an adhesive to resist bond failure when used in the construction of containers when the bonds are subjected to shearing forces at elevated temperatures.

Chip board (21 point) is cut into 2-inch wide by 9-inch long strips. Four strips are prepared. The chip board is wrapped around a 250-ml beaker and bonded together with 0.25 gram of molten hot adhesive and pressure applied to secure the bond.

The specimens are placed in an oven and observed as the temperature of the oven rises. The temperature at which the bond failure occurs is recorded. The pop-oven temperature is that temperature at which the specimen fails (three test average) minus 4° F.

Room Temperature Peel

This test measures the strength of a bond formed when two papers are sealed with a hot melt adhesive.

The speciments are prepared by coating 40-pound Kraft paper using a Gardner knife to obtain a 2.0-mil thickness coating of hot melt adhesive. Strips of 1-inch by 3-inch are cut and heat sealed to uncoated cover sheets the same size.

The test is made by securing the free end of one strip to a ringstand. To the other strip is attached a light weight cup. Weighed shot is added to the cup until a steady tear is noted. The average weight of ten specimens is the room temperature peel strength in grams per inch of width.

It can be seen from Table 2 that the composition according to the present invention has adhesive properties equal to or better than the blend containing the polyterpene resins. The hot melts of this invention have better color and better melt stability. No skimming or gel formation was noted after 312 hours in a metal beaker compared to skimming after 168 hours for the terpene resin blends.

TABLE 2

Adhesive Properties of Hot Melt Formulations

| No. | 1 | |
| --- | --- | --- |
| Composition | | |
| Polyethylene | 70 | 70 |
| DAC-B Resin | 29.5 | |
| Nirez 1135 resin | | 14.75 |
| PICCOLYTE α-135 resin | | 14.75 |
| Plastanox 1212 antioxidant | 0.375 | 0.375 |
| Plastanox 2246 antioxidant | 0.125 | 0.125 |
| Properties | | |
| Gardner Color (100%) | 2 | 6 |
| Viscosity at 177°C., cp | 2680 | 2350 |
| Ring and Ball softening point, °C. | 99.0 | 98.4 |
| Adhesive properties | | |
| Room temperature peel, g | 675 | 650 |
| Elevated Temperature peel, °F. | 118 | 117 |
| 2" Pop-open, °F | 190 | 158 |
| Melt Stability at 177°C. | | |
| Glass beaker | 240 hr -No skim | 120 hr - No skim or gel |
| | | 240 hr - Skim and gel |
| Metal beaker | 312 hr -No skim | 72 hr - No skim or gel |
| | | 168 hr - Skim on top |

EXAMPLE 3

This example compares low viscosity hot melt adhesives of this invention with one containing a commercial hydrocarbon resin, i.e., Wingtack 95 resin.

Blend compositions, physical and adhesive properties, and stabilities are given in Table 3.

The same procedures were used in preparing the hot melts and for testing the adhesive and stability properties described in Example 2.

TABLE 3

Low Viscosity Hot Melt Formulations

| | Sample | |
| --- | --- | --- |
| Compositions | 1 | 2 |
| % Polyethylene (Viscosity-9000 cp at 150°C.) | 58 | 54 |
| % Polyethylene (Viscosity-400 cp at 125°C.) | 12 | 16 |
| % Wingtack 95 resin[1] | 29.5 | |
| % DAC-B Resin[2] | | 29.5 |
| % DLTDP | 0.25 | 0.25 |
| % Plastanox 2246 antioxidant | 0.25 | 0.25 |
| Properties | | |
| Gardner color | 8 | 2 |
| Viscosity at 350°F., cp | 1450 | 1380 |
| Ring and Ball softening point, °C. | 100 | 102 |
| Adhesive properties | | |
| Room temperature peel, g | 600 | 610 |
| Elevated Temperature peel, °F. | 90 | 110 |
| 2" Pop-open, °F. | 150 | 160 |
| Scum stability at 375°F. | | |
| % Surface Area Covered - 24 hr | 25 | 0 |
| - 48 hr | 100 | 0 |
| - 72 hr | — | 0 |
| - 96 hr | — | 0 |
| Accelerated aging at 20% relative humidity and 120°F. for 4 weeks | | |
| Corrugated board to corrugated | No fiber tear | Fiber tear |
| Kraft paper to Kraft paper | No fiber tear | Fiber tear |

[1] Wingtack 95 softening point 100°C.
[2] DAC-B resin softening point 128°C.

The hot melts of this invention, as indicated in Table 3, show better melt color, better scum stability, no odor, and improved adhesive property of elevated temperature peel than commercial hot melt adhesives. The elevated temperature properties are of real importance with regard to cardboard containers which are subjected to these temperatures in shipment. If the hot melt does not have the higher elevated temperature properties, the bond will fail and the carton in thus open and its contents subject to spillage or contamination.

It can also be seen that on long-term aging at 120° F. the hot melts of this invention show fiber tear after 4 weeks compared to the blends with Wingtack resin which show bond failure with no fiber tear.

The invention has been described in detail with particular reference to preferred embodiments thereof, but it will be understood that variations and modifications can be effected within the spirit and scope of the invention described hereinabove.

We claim:

1. A hot melt adhesive composition having improved thermal and color stability comprising a mixture of from 50 to 90 parts by weight of a poly-alpha-olefin component and 10 to 50 percent by weight of a light-color, high softening point hydrocarbon resin having a ring and ball softening point of 120 to 155° C. prepared by polymerizing DAC-B using aluminum chloride as a catalyst in a two-stage reaction system wherein the polymerization is conducted at a temperature of about 50° to 100° C. in the first stage for about 6–10 hours and subsequently polymerized in the second stage at a temperature of about 125° C. to 150° C. for about 6–10 hours to obtain a solution containing a high softening point crude resin in good yields, removing the chlorides from the resin solution by methanol extraction or high temperature lime treatment followed by low pressure hydrogenation at hydrogen pressure of 100–1000 psig. and/or alumina treatment, followed by high pressure-high temperature hydrogenation at hydrogen pressures of 3,000–6,000 psig. and temperature greater than 300° C. to remove color and reduce unsaturation and thereafter stripping the resin solution to obtain low color, color stable, high softening point hydrocarbon resin in good yields.

2. A hot melt adhesive composition according to claim 1 wherein the poly-alpha-olefin component is polyethylene which has a viscosity in the range of 400 cp. at 125° C. to 500,000 cp at 190° C.

3. A hot melt adhesive composition comprising a mixture of from 65 to 75 parts by weight of 50 polyethylene having a density of 0.90 to 0.92, ring and ball softening point of 105° to 107°C. and 25 to 35 percent of a light-color, high softening point hydrocarbon resin having a ring and ball softening point of 125° to 135° C. and having excellent thermal stability prepared by polymerizing DAC-B using aluminum chloride as a catalyst in a two-stage reaction system wherein the polymerization is conducted at a temperature of about 50° to 100° C. in the first stage for about 6–10 hours and subsequently polymerized in the second stage at a temperature of about 125° C. to 150° C. for about 6–10 hours to obtain a solution containing a high softening point crude resin in good yields, removing the chlorides from the resin solution by methanol extraction or high temperature lime treatment followed by low pressure hydrogenation at hydrogen pressure of 100–1,000 psig. and/or alumina treatment, followed by high pressure-high temperature hydrogenation at hydrogen pressures of 3,000–6,000 psig. and temperature greater than 300° C. to remove color and reduce unsaturation and thereafter stripping the resin solution to obtain low color, color stable, high softening point hydrocarbon resin in good yields.

4. A hot melt adhesive composition according to claim 3 in which the melt viscosity range is 1,500 to 4,500 cp at 177° C.

5. A hot melt adhesive composition according to claim 3 which contains 0.10 to 2.0 percent of antioxidants.

6. A hot melt adhesive composition having improved thermal and color stability consisting essentially of a mixture of from 50 to 90 parts by weight of a poly-alpha-olefin component and 10 to 50 percent by weight of a light-color, high softening point hydrocarbon resin having a ring and ball softening point of 120° to 155° C. prepared by polymerizing DAC-B using aluminum chloride as a catalyst in a two-stage reaction system wherein the polymerization is conducted at a temperature of about 50° to 100° C. in the first stage for about 6–10 hours and subsequently polymerized in the second stage at a temperature of about 125° to 150° C. for about 6–10 hours to obtain a solution containing a high softening point crude resin in good yields, removing the chlorides from the resin solution by methanol extraction or high temperature lime treatment followed by low pressure hydrogenation at hydrogen pressure of 100–1000 psig. and/or alumina treatment, followed by high pressure-high temperature hydrogenation at hydrogen pressures of 3,000–6,000 psig. and temperature greater than 300° C. to remove color and reduce unsaturation and thereafter stripping the resin solution to obtain low color, color stable, high softening point hydrocarbon resin in good yields, said mixture containing 0.10 to 2.0 percent by weight of antioxidants. 190°

7. A hot melt adhesive composition according to claim 6 wherein the poly-alpha-olefin component is polyethylene which has a viscosity in the range of 400 cp at 125° C. to 500,000 cp at 190° C.

8. A hot melt adhesive composition according to claim 7 wherein said antioxidants are dilauryl 3,3'-thiodipropionate and lauryl stearyl thiodipropionate.

9. A hot melt adhesive composition according to claim 7 wherein said antioxidants are lauryl stearyl thiodipropionate and 2,2'-methylene bis (4-methyl-6-t-butyl phenol).

* * * * *